United States Patent
Rajagopal et al.

(10) Patent No.: US 9,985,866 B1
(45) Date of Patent: May 29, 2018

(54) TASK PERFORMANCE WITH VIRTUAL PROBES IN A NETWORK FUNCTION VIRTUALIZATION (NFV) SOFTWARE DEFINED NETWORK (SDN)

(71) Applicant: Sprint Communications Company L.P., Overland Park, KS (US)

(72) Inventors: Arun Rajagopal, Leawood, KS (US); Marouane Balmakhtar, Alexandria, VA (US); Carl Joseph Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 82 days.

(21) Appl. No.: 15/217,981

(22) Filed: Jul. 23, 2016

(51) Int. Cl.
*H04L 12/26* (2006.01)
*H04W 8/02* (2009.01)
*H04L 12/931* (2013.01)
*H04L 29/06* (2006.01)
*H04W 88/16* (2009.01)

(52) U.S. Cl.
CPC .............. *H04L 43/50* (2013.01); *H04L 43/10* (2013.01); *H04L 43/12* (2013.01); *H04L 49/70* (2013.01); *H04W 8/02* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 8,600,792 B2 | 12/2013 | Drittler et al. | |
| 8,699,359 B2 | 4/2014 | Eskicioglu et al. | |
| 9,210,061 B2 | 12/2015 | Richards et al. | |
| 9,311,160 B2 | 4/2016 | Parker | |
| 9,769,065 B2 * | 9/2017 | Manghirmalani | H04L 45/38 |
| 2011/0122761 A1 | 5/2011 | Sriram | |
| 2014/0201374 A1 | 7/2014 | Ashwood-Smith et al. | |
| 2014/0220998 A1 | 8/2014 | Kovacs et al. | |
| 2014/0317261 A1 | 10/2014 | Shatzkamer et al. | |
| 2014/0317293 A1 * | 10/2014 | Shatzkamer | G06F 9/455 |
| | | | 709/226 |
| 2015/0063166 A1 | 3/2015 | Sif et al. | |

(Continued)

FOREIGN PATENT DOCUMENTS

| | | |
|---|---|---|
| CN | 103995899 | 8/2014 |
| WO | 2015061353 | 4/2015 |

(Continued)

*Primary Examiner* — Eunsook Choi

(57) ABSTRACT

A Network Function Virtualization (NFV) Software Defined Network (SDN) performs a network task. An NFV management system processes Key Performance Indicators (KPIs) to identify the network task and to direct an NFV orchestration system to install a virtual Probe (vProbe) with filter criteria to collect additional KPIs for the network task. The NFV orchestration system directs an NFV Infrastructure (NFVI) to install the vProbe. The vProbe sends the filter criteria to a virtual Switch (vSW) in the NFVI, and the vSW applies the filter criteria to Virtual Network Function (VNF) traffic and transfers the filtered data to the vProbe. The vProbe processes the filtered data to generate the additional KPIs for the NFV management system. The NFV management system processes the additional KPIs to perform the network task.

20 Claims, 6 Drawing Sheets

(56) References Cited

U.S. PATENT DOCUMENTS

| | | | |
|---|---|---|---|
| 2015/0124622 A1* | 5/2015 | Kovvali | H04W 28/0215 370/236 |
| 2015/0149613 A1 | 5/2015 | Kakadia et al. | |
| 2015/0180730 A1 | 6/2015 | Felstaine et al. | |
| 2015/0263979 A1 | 9/2015 | Kasturi | |
| 2016/0269925 A1* | 9/2016 | Chou | H04W 28/0226 |
| 2016/0301601 A1* | 10/2016 | Anand | H04L 47/12 |
| 2016/0352866 A1* | 12/2016 | Gupta | H04L 67/42 |

FOREIGN PATENT DOCUMENTS

| | | |
|---|---|---|
| WO | 2015101153 | 7/2015 |
| WO | 2015135611 | 9/2015 |
| WO | 2015143610 | 10/2015 |
| WO | 2015183940 | 12/2015 |
| WO | 2016037479 | 3/2016 |

* cited by examiner

TASK PERFORMANCE WITH VIRTUAL PROBES IN A NETWORK FUNCTION VIRTUALIZATION (NFV) SOFTWARE DEFINED NETWORK (SDN)

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs execute on Network Function Virtualization (NFV) computer systems. NFV computer systems have Virtual Network Functions (VNFs) that perform like typical communication network elements or portions of these network elements. The VNFs run under the control of a virtual layer (hypervisors, virtual containers, NFV applications) that control VNF access to NFV hardware (circuitry, memory, communication interfaces). To implement a data communication service, an NFV Management and Orchestration (MANO) system drives the NFV hardware to execute and support the VNFs based on various descriptors for the data communication service. In NFV SDN systems, the VNFs may be SDN applications, SDN controllers, and SDN virtual data machines.

The NFV SDN systems generate Key Performance Indicators (KPIs) that characterize their performance. Unfortunately, the technology to efficiently and effectively use NFV SDN KPIs is limited. The KPIs are typically general in nature. The installation of virtual probes to generate better KPIs remains cumbersome and expensive.

TECHNICAL OVERVIEW

A Network Function Virtualization (NFV) Software Defined Network (SDN) performs a network task with a virtual probe (vProbe). An NFV management system processes Key Performance Indicators (KPIs) to identify the network task and to direct an NFV orchestration system to install the vProbe with filter criteria to collect additional KPIs for the network task. The NFV orchestration system directs an NFV Infrastructure (NFVI) to install the vProbe. The vProbe sends the filter criteria to a virtual Switch (vSW) in the NFVI, and the vSW applies the filter criteria to Virtual Network Function (VNF) traffic and transfers the filtered data to the vProbe. The vProbe processes the filtered data to generate the additional KPIs for the NFV management system. The NFV management system processes the additional KPIs to perform the network task.

DETAILED DESCRIPTION

Figure 1:
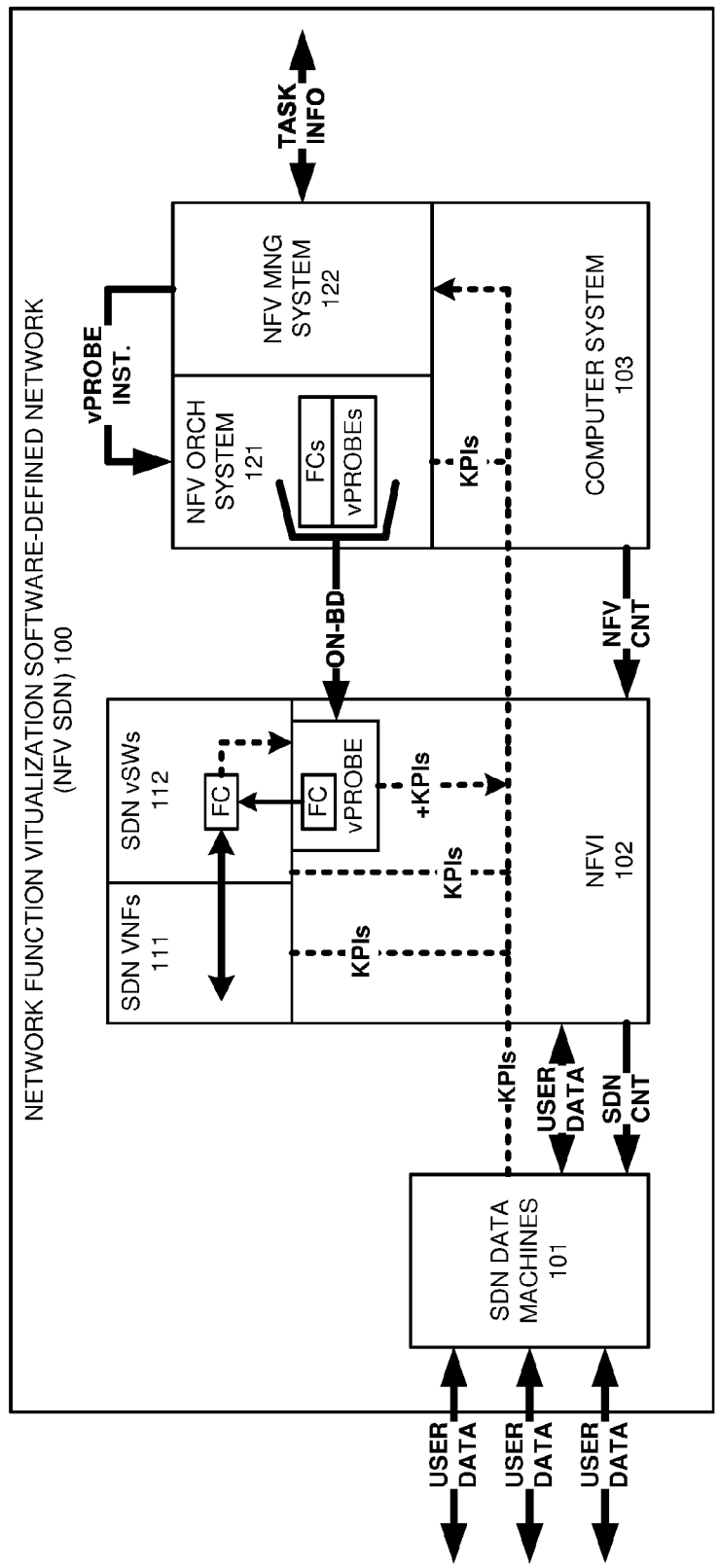
FIGS. 1-4 illustrate a Network Function Virtualization (NFV) Software Defined Network (SDN) to perform network tasks with virtual Probes (vProbes).

FIGS. 1-4 illustrate Network Function Virtualization (NFV) Software Defined Network (SDN) 100 to perform network tasks with virtual Probes (vProbes). NFV SDN 100 exchanges user data for user devices like computers, phones, or some other intelligent machines. The data exchange supports data services such as media streaming, audio/video conferencing, file transfers, internet access, or some other computerized information service. Data communication system 100 comprises SDN data machines 101, NFV Infrastructure (NFVI) 102, and computer system 103. SDN data machines 101, NFVI 102, and computer system 103 each comprise data processing circuitry, data memory, operating software, and data communication transceivers.

NFVI 102 comprises SDN Virtual Network Functions (VNFs) 111 and SDN virtual Switches (vSWs) 112. Computer system 103 comprises NFV Orchestration (ORCH) system 121 and NFV Management (MNG) system 122. SDN VNFs 111 comprise SDN applications and controllers that are communicatively linked to each other through vSWs 112. The SDN controllers are communicatively linked to SDN data machines 101 through vSWs 112. Both the SDN applications and controllers are communicatively linked to computer system 103 through vSWs 112.

To deliver a data service, the SDN application VNFs 111 transfer SDN controller Application Programming Interface (API) calls to the SDN controller VNFs 111. The SDN controller VNFs 111 receive and process the SDN controller API calls to generate and transfer SDN data machine API calls. SDN data machines 101 receive and process the SDN data machine API calls to perform actions on the user data like packet forwarding, storing, and dropping. Some user data may be transferred to NFVI 102 for more complex processing like video transcoding or decryption. SDN data machines 101 return data machine API responses to the SDN controller VNFs 111. In NFVI 102, the SDN controller VNFs receive and process the data machine API responses to generate and transfer SDN controller responses that are sent to the SDN application VNFs 111.

The components of NFV SDN 100 generate and transfer Key Performance Indicators (KPIs) to NFV management system 122—perhaps through NFV orchestration system 121. The KPIs characterize the current state of the NFV and SDN systems. Thus, the KPIs may comprise SDN metrics for SDN API calls and/or NFV metrics for Central Processing Unit (CPU), memory, and Input/Output (I/O) resources. The KPIs are typically processed to determine VNF performance and NFV usage. The KPIs may comprise fairly raw metrics or they may be more advanced. For example, a KPI might be average transaction times for Flow Description Table (FDT) updates in SDN data machines 101. The logical distribution of advanced KPI development between the SDN/NFV systems and NFV management system 122 may vary.

NFV management system processes the KPIs to generate various NFV SDN indices. NFV management system 122 may combine a set of indices into one or more combined indices. In a simplified example, NFV management system 122 may process KPIs to determine an amount of SDN API calls, SDN FDT updates, NFV I/O traffic, and NFV memory consumption for a specific Uniform Resource Indicator (URI). NFV management system 122 then develops an index for a data service based on these KPIs. A simple index might be: [A*(#API calls)+B*(#FDT updates)]/[C*(NFV I/O traffic)+D*(NFV memory consumption)]; where A, B, C, and D are normalizing and scaling factors.

NFV management system 122 processes the NFV SDN indices to control SDN VNFs 111. NFV management system 122 may process the indices to on-board or relocate individual SDN VNFs 111. NFV management system 122 may process the indices to de-allocate resources (darken) and re-allocate resources (lighten) for individual SDN VNFs 111. NFV management system 122 may process the indices to on-board additional vSWs 112 into NFVI 102.

In addition, NFV management system 122 processes the NFV SDN indices to identify network tasks. Although the network tasks may vary, exemplary tasks include collecting CDN efficiency data, Home Subscriber System (HSS) access data, Mobility Management Entity (MME) mobility data, Packet Data Network Gateway (P-GW) signaling, and International Mobile Subscriber Identity (IMSI) communication path data. NFV management system 122 transfers vProbe instructions to NFV orchestration system 121 to install a vProbe with task-focused FC to collect additional task-focused KPIs (+KPIs) in NFVI 102. NFV orchestration system 100 transfers NFV control data to NFV SDN 100 to on-board the vProbe with the FC.

NFV SDN 100 on-boards the vProbe and FC. The installed vProbe sends the FC to one or more vSWs 112. The vSWs 112 apply the FC to SDN VNF 111 traffic that traverses vSWs 112. The vSWs 112 transfers the filtered VNF traffic to the vProbe. The vProbe processes the filtered VNF data to generate the +KPIs for NFV management system 122. NFV management system 122 processes the +KPIs to perform the network tasks.

For example, the standard KPIs and indices may cross a threshold that triggers the network task of performing an NFV SDN efficiency analysis for a Content Delivery Network (CDN) operating in NFVI 102. NFV management system 122 processes NFV SDN indices to on-board a vProbe having CDN-focused FC to collect +KPIs for this specific network task. The FC may comprise data like CDN prefixes, addresses, URIs, and the like. The FC may comprise specific NFV SDN data supporting the CDN like NFV Network Service Descriptor (NSDs), VNF Descriptors (VNFDs), VNF Forwarding Graphs (VNFFGs), and Physical Network Function Descriptions (PNFDs). The FC may also comprise NFV data supporting the CDN like processing core IDs, virtual machine IDs, memory locations, I/O transceivers, and the like.

In the CDN efficiency example, NFV management system 122 may deploy specific vProbes for a particular CDN VNFFG to collect CDN efficiency +KPIs. The specific CDN VNFFG could include downstream CDN (dCDN) server VNFs with CDN Interface (CDNI) VNF Components (VN-FCs). The CDNI VNFC traffic for the CDN VNFFG could then be probed for video service metrics related to specific URIs pre-positioned at specific dCDN servers.

The vProbes inject the CDN FC for the CDN +KPIs into the vSWs 112, and the CDN FCs filter VNF traffic based on the pertinent CDN NFV SDN data. The vProbe then transfers the CDN +KPIs to NFV management system 122. In this example, NFV management system 122 processes the +KPIs (and possibly the other KPIs) to perform the CDN efficiency analysis for NFVI 102. After performing the network task, NFV management system 122 may direct NFV orchestration system 121 to uninstall the vProbe from NFVI 102. NFV orchestration system 121 directs then NFVI 102 to uninstall the vProbe, and NFVI 102 off-boards the vProbe.

Figure 2:
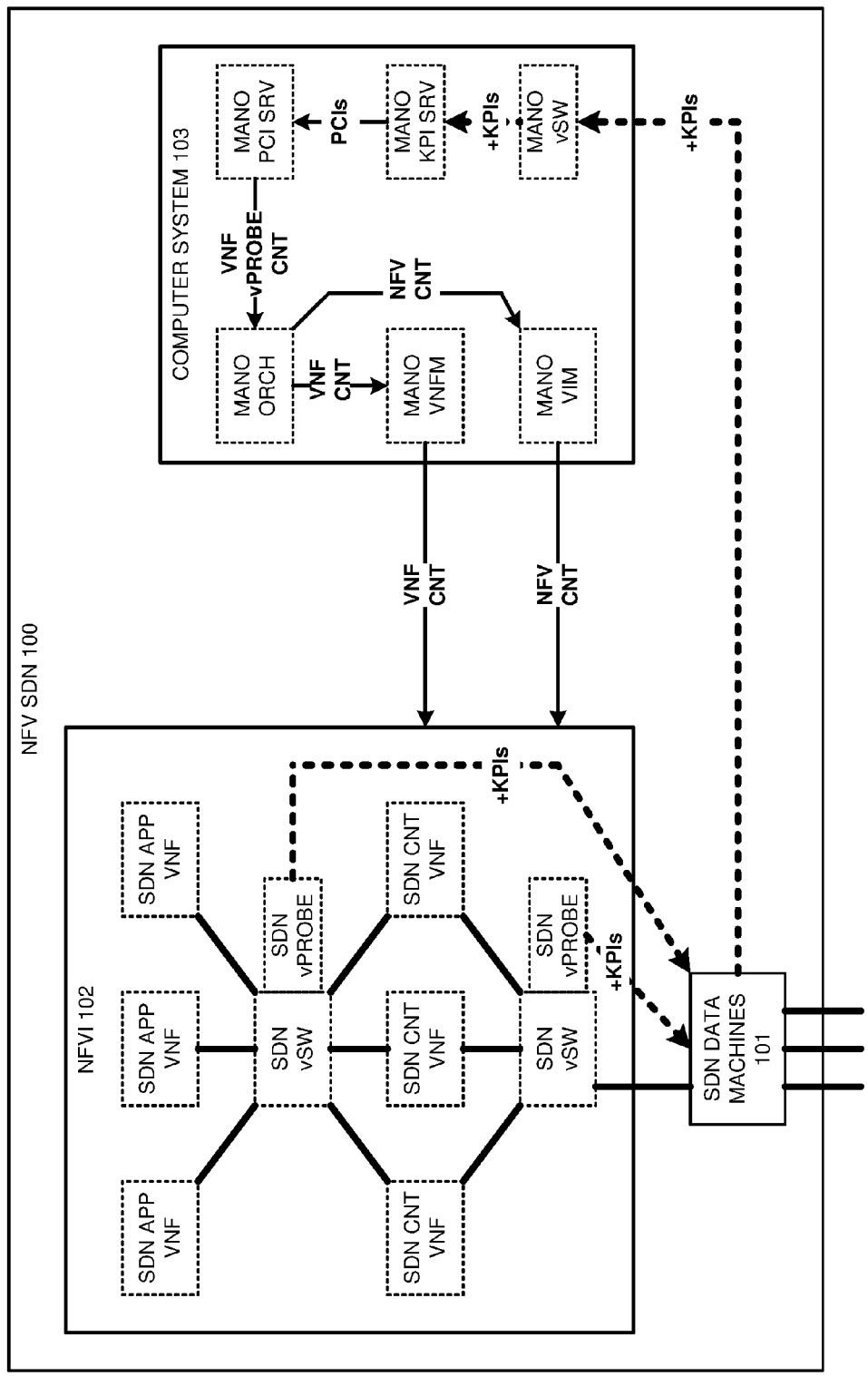

Referring to FIG. 2, NFV SDN 100 is further illustrated with an SDN architecture. NFVI 102 is shown with SDN application (APP) VNFs linked with SDN controller (CNT) VNFs through an SDN vSW. The SDN CNT VNFs are linked to SDN data machines 101 over another SDN vSW. Computer system 103 is shown with a MANO orchestrator (ORCH), VNF Manager (VNFM), Virtual Infrastructure Manager (VIM), vSW, KPI server, and PCI server. The MANO vSW is linked to SDN data machines 101.

To deliver the data service, the SDN application VNFs transfer SDN controller API calls to the SDN controller VNFs over the upper SDN vSW. The SDN controller VNFs receive and process the SDN controller API calls to generate and transfer SDN data machine API calls over the lower vSW. SDN data machines 101 receive and process the SDN data machine API calls to perform actions on the user data and return SDN data machine API responses. The SDN controller VNFs receive and process the data machine API responses to transfer SDN controller responses to the SDN application VNFs.

The SDN vSWs measure SDN KPIs and transfer SDN KPI data to the MANO KPI server through the MANO vSW. Typically, data machines 101, NFVI 102, VNFs, VIM, VNFM, and/or ORCH also measure KPIs and transfer KPI data to the MANO KPI server. The MANO KPI server processes the NFV/SDN KPI data to generate various system indices referred to as Proxy Correlation Indices (PCIs)—including combination PCIs (cPCIs). The MANO KPI server transfers the PCIs and cPCIs to the MANO PCI server.

The MANO PCI server processes the PCIs and cPCIs to control the SDN APP VNFs. In particular, the MANO PCI server processes the PCIs and cPCIs to on-board and off-board VNFs, to darken and lighten VNFs, and to relocate VNFs. For example, the SDN vSWs may measure and transfer VNF load KPIs, and the KPI server indexes the VNF load KPIs. The PCI server processes the VNF load indexes to identify individual SDN APP that should be darkened or relocated. SDN CNT VNFs may also be darkened and relocated.

The PCI server transfers VNF control data to the MANO ORCH. The MANO ORCH processes the VNF control data to generate VNF control data for the VNFM and NFV control data for the VIM. The MANO VIM and VNFM implement the NFV and VNF controls through NFVI 102. For example, NFVI 102 may darken one of the SDN APP VNFs by restricting its data processing, storage, and/or communication resources. The VNFM may notify the VNF and/or other VNFs of the VNF darkening. The VIM directs NFVI 102 to perform the VNF darkening. In another example, NFVI 102 may relocate one of the SDN APP VNFs to another NFVI. The VNFM may notify the VNF and/or other VNFs of the VNF relocation. The VIM directs NFVI s to perform the VNF relocation.

In addition to VNF control, NFV management system 122 also processes the NFV SDN indices to identify network tasks. Although the network tasks may vary, exemplary tasks include collecting CDN efficiency data, HSS access data, MME mobility data, P-GW signaling data, and IMSI communication path data. NFV management system 122 transfers vProbe instructions to the MANO orchestration system to install vProbes with task-focused FC to collect the +KPIs from NFVI 102. The NFV orchestration system transfers NFV control data to NFV SDN 100 to on-board vProbes with the task-focused FC. NFV SDN 100 on-boards the vProbes and FC.

The installed vProbes send the FC to their vSWs. The vSWs apply the FC to the SDN VNF traffic that traverses the vSWs. The vSWs transfer the filtered VNF traffic to the vProbes. The filtered VNF traffic typically comprises SDN application and/or SDN controller traffic. The vProbes process the filtered VNF data to generate and transfer the +KPIs to the MANO KPI server. The KPI server processes the KPIs and the +KPIs to generate additional indices and PCIs and cPCIs. The MANO PCI server processes the PCIs and cPCIs to perform the network tasks.

For example, a cPCI for a wireless network may cross a threshold that triggers the network task of performing an NFV SDN efficiency analysis for a wireless communication network served by NFVI 102. NFV management system 122 processes NFV SDN indices to on-board a vProbe having wireless network focused FC to collect +KPIs for this specific network task. The FC may comprise data like wireless network IDs, prefixes, addresses, URIs, and the like. The FC may comprise specific NFV SDN data supporting the wireless network, like NFV NSDs, VNFDs, VNFFGs, and PNFDs. NFV management system 122 may deploy specific vProbes for a particular network VNFFG to collect the network efficiency +KPIs. The wireless network VNFFG could include MME, HSS, P-GW, and other systems with networking VNFCs. The networking VNFCs in the wireless network VNFFG could then be probed for wireless service metrics related to specific users at various locations.

The vProbes inject the wireless networking FC for the +KPIs into the vSWs 112, and the FCs are used to filter VNF traffic based on the pertinent wireless network, NFV, and SDN data. The vProbes then transfer the +KPIs to NFV management system 122. In this example, NFV management system 122 processes the +KPIs (and possibly the other KPIs) to perform a user mobility analysis for the wireless network.

Figure 3:
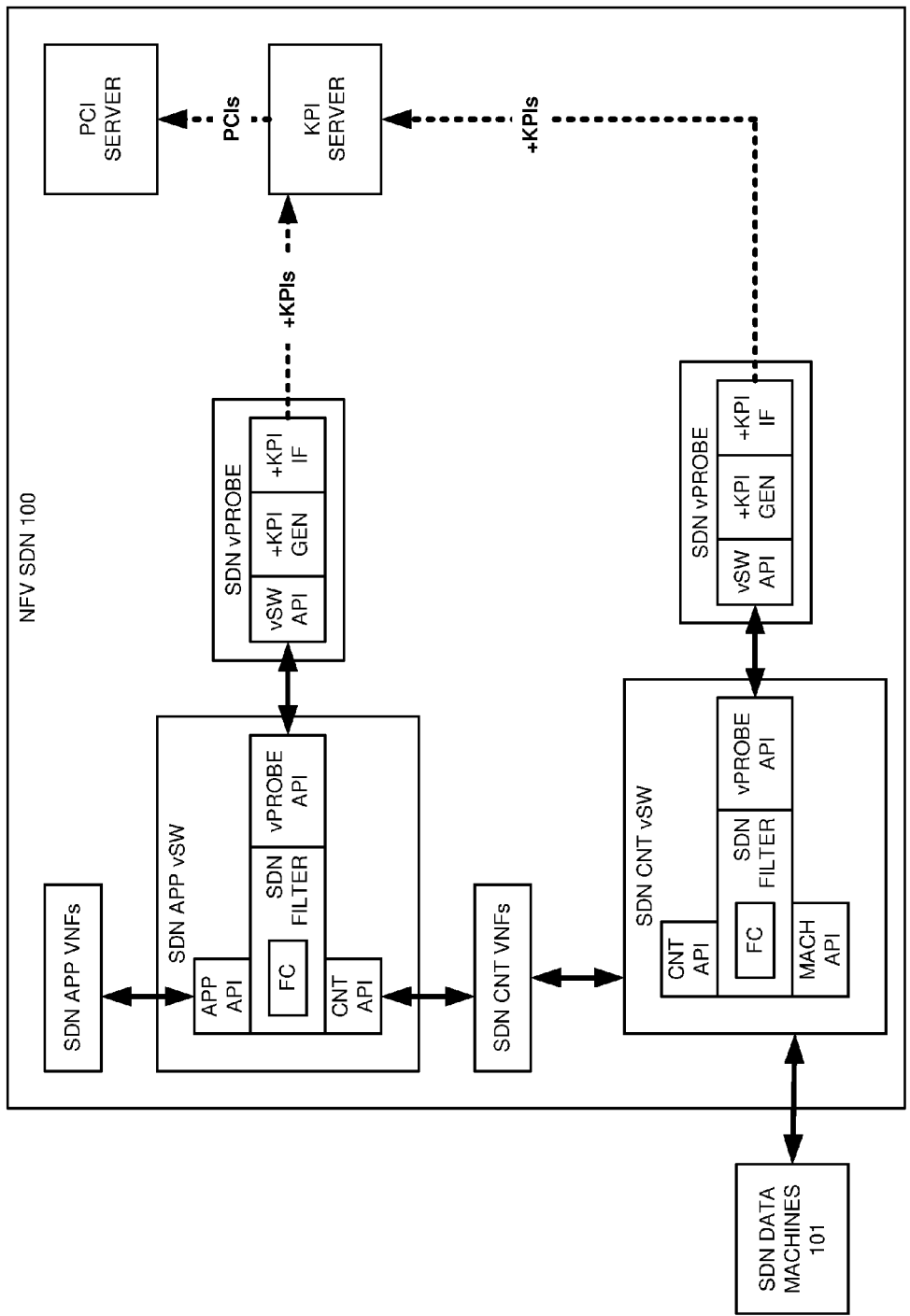

Referring to FIG. 3, the SDN vProbes are further described for NFV SDN 100. The SDN APP VNFs communicate with the SDN CNT VNFs through an SDN APP vSW. The SDN APP vSW has an APP API to exchange API calls and responses with the SDN APP VNFs. The SDN APP vSW also has a CNT API to exchange the API calls/responses with the SDN CNT VNFs. The SDN filter routes the API calls/responses between the APP API and the CNT API.

The SDN CNT vSW has a CNT API to exchange API calls and responses with the SDN APP VNFs. The SDN CNT vSW also has a Machine (MACH) API to exchange the API calls/responses with SDN data machines 101. The SDN filter routes the API calls/responses between the CNT API and the MACH API.

The SDN vProbes inject their FC into the SDN vSWs over their vSW and vProbe APIs. The SDN filters apply the FC from the SDN vProbes to select API calls, responses, and metadata (like FDT update API counts) to send to the vProbe over the vProbe API. In the vProbes, the vProbe API transfers the filtered VNF data to the vSW API. The vSW API transfers the filtered VNF data to the +KPI GEN. The +KPI GEN processes the filtered VNF data to generate the +KPIs that are focused on the given network task.

The SDN probes may be inserted into existing vSWs or deployed in a new vSW. The NSD, VNFD, and VNFFG may specify the placement of the vProbes. The vProbes may be configured to detect and measure +KPIs for specific users, networks, NFVIs, VNFs, IP prefixes, URIs, and the like. The VNF probes may be configured to generate the +KPI data based on specified API call/response types, CPU IDs, memory locations, I/O transceivers, or some other networking attribute.

The KPI server processes the SDN KPIs and +KPIs to generate various Proxy Correlation Indices (PCIs)—including combination PCIs (cPCIs). The KPI server transfers the PCIs and cPCIs (and possibly the +KPIs) to the PCI server. The PCI server processes the PCIs, cPCIs, and possibly the +KPIs to perform the requisite network task.

Figure 4:
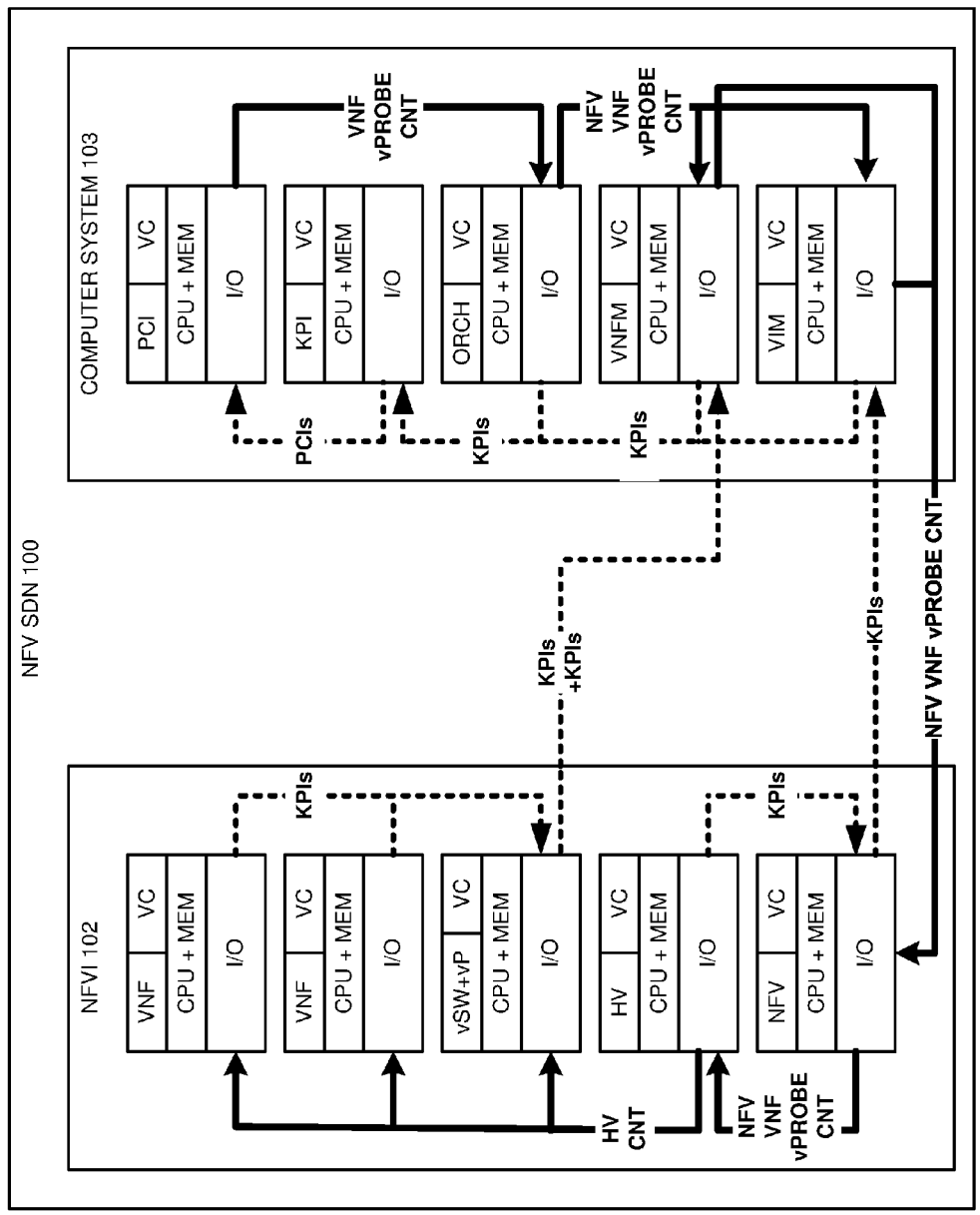

Referring to FIG. 4, data communication system 100 is further illustrated with an NFV architecture. NFVI 102 and computer system 103 are shown with Central Processing Unit cores (CPUs), memory units (MEM), and Input/Output transceivers (I/O). This specific hardware design is simplified for illustrative purposes, and actual hardware implementations will vary. In NFVI 102, two VNFs and their Virtual Containers (VCs) execute on CPU cores. A vSW, vProbe (vP), and their VC execute on another CPU core to support the two VNFs. A hypervisor (HV) and VC execute on a CPU core to control VNF access to the CPU cores, MEM, and I/O. An NFV interface and VC execute on a CPU core to communicate with computer system 103.

In computer system 103, an ORCH and VC execute on a CPU core to orchestrate NFVI 102. A VIM and VC execute on a CPU core to direct NFVI 102 for the ORCH. A VNFM and VC execute on another CPU core to manage VNFs in NFVI 102 for the ORCH. A KPI server and VC execute on a CPU core to translate KPIs into PCIs/cPCIs. A PCI server and VC execute on a CPU core to translate the PCIs and cPCIs into VNF control data that triggers the performance of network tasks.

The VNFs, vSW, HV, and NFV interface may all generate KPIs. The VNFs and vSW transfer their KPIs to the VNFM. The HV and NFV interface transfer their KPIs to the VIM. The VNFM and VIM generate their own KPIs and transfer the KPI data to the KPI server. In alternative examples, the vSW and the NFV interface may transfer the KPI data directly to the KPI server to bypass the VNFM and the VIM.

The KPI server processes the KPIs to generate PCIs and cPCIs for the PCI server. The PCI server processes the PCIs and cPCIs to generate vProbe control data. The PCI server transfers the vProbe control data to the ORCH. The ORCH processes the vProbe control data to generate NFV VNF vProbe control data for the VNFM and the VIM. The VIM and VNFM transfer NFV VNF vProbe control data to the NFV interface. The NFV interface transfers the NFV VNF vProbe control data to the HV. The HV exerts HV control to on/off-board VNFs and vProbes, and to relocate VNFs and vProbes. The HV exerts HV control to load and move VNFs and vProbes. For example, the PCI server may transfer vProbe control data to load the vProbe with task-focused FC into the vSW CPU.

The PCI server also processes the NFV PCIs and cPCIs to identify network tasks. Exemplary tasks include collecting data for a CDN, HSS, MME, P-GW, and IMSI. The PCI server transfers vProbe instructions to the NFV ORCH to install a vProbe with task-focused FC to collect the +KPIs in NFVI 102. The NFV ORCH transfers NFV vProbe control data to the VNFM and VIM which transfer corresponding vProbe control data to the NFV interface in NFVI 102.

The NFVI interface directs the hypervisor to install the vProbe, and the hypervisor on-boards or moves the vProbe to the vSW CPU. The installed vProbe sends the FC to the VSW, and the vSW applies the FC to SDN VNF traffic that traverses the vSW. The vSW transfers the filtered VNF traffic to the vProbe. The vProbe processes the filtered VNF data to generate and transfer the +KPIs for the KPI server. The PCI server processes the +KPIs to perform the network tasks.

For example, a service quality index may cross a threshold that triggers the network task of creating an HSS access records for a given IMSI group. The PCI server directs the ORCH which controls the VNFM and the VIM to load the vProbe for the HSS/IMSI analysis. The vProbes inject the HSS/IMSI FC for +KPIs into the vSWs, and the FCs filter VNF traffic based on the pertinent data. The vProbe then transfers the +KPIs to the KPI server for indexing and delivery to the PCI server. In this example, the PCI server processes the +KPIs to track IMSI service access through the HSS while the service quality index remains above the threshold.

Figure 5:
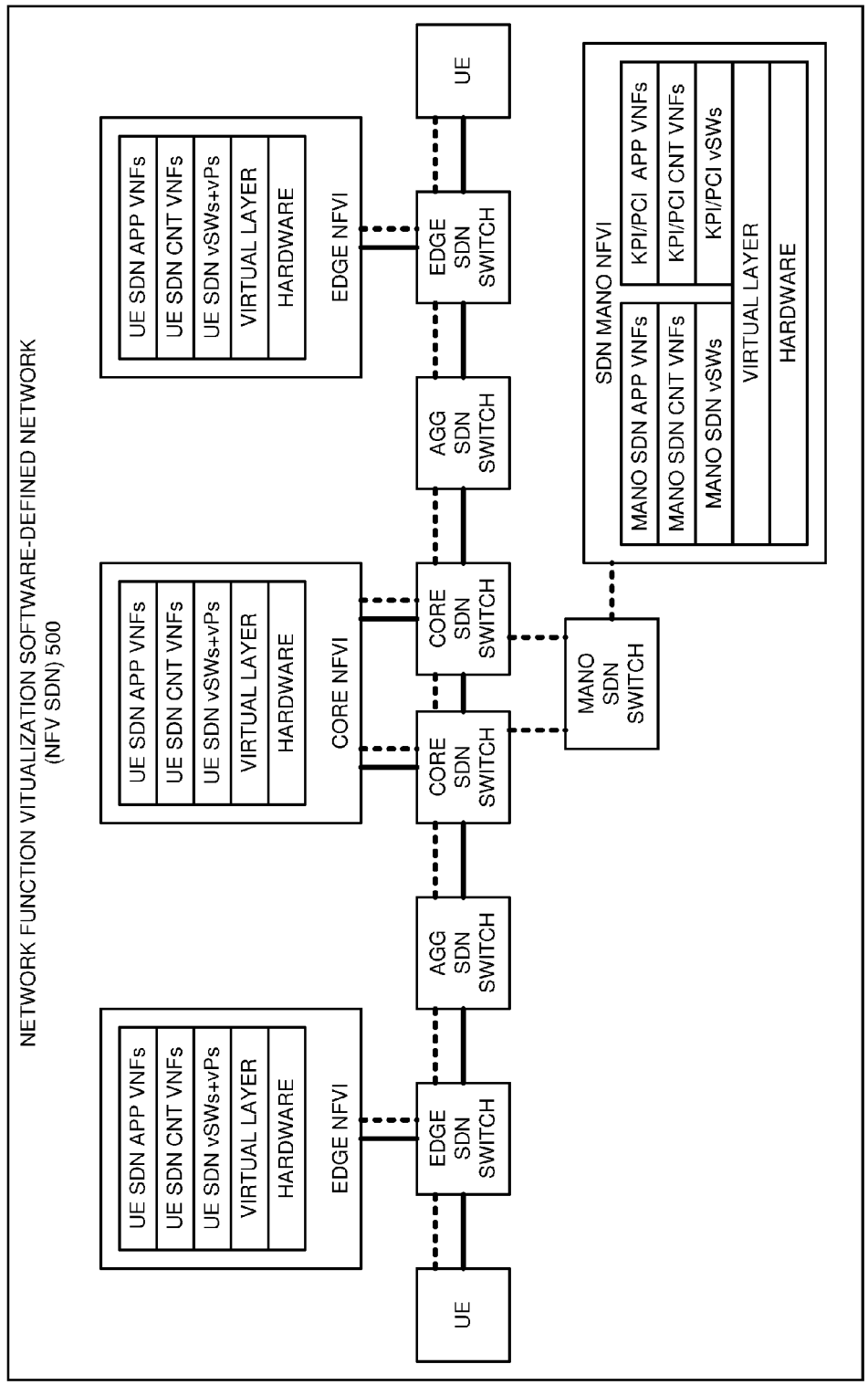
FIG. 5 illustrates a Network Function Virtualization (NFV) Software Defined Network (SDN) to perform network tasks with virtual Probes (vProbes).

FIG. 5 illustrates Network Function Virtualization (NFV) Software Defined Network (SDN) 500 to control Virtual Network Functions (NFVs). NFV SDN 500 is an example of data communication system 100, although system 100 may use alternative configurations and operations. NFV SDN 500 comprises: User Equipment (UE), edge SDN switches, aggregation (AGG) SDN switches, core SDN switches, a MANO SDN switch, edge NFVIs, a core NFVI, and an SDN MANO NFVI. The NFVIs comprise hardware such as CPU cores, flash memories, and I/O transceivers. The edge SDN switches may include wireless base station VNFs that drive nearby wireless transceivers to exchange wireless data with the UEs.

The NFVIs execute virtual layer software to provide a virtualized processing environment. Under the control of the MANO system, the virtual layers execute various SDN VNFs. In the edge and core NFVIs, the virtual layers execute UE SDN virtual switch (vSW) VNFs, UE SDN virtual Probe (vP) VNFs, UE SDN controller (CNT) VNFs, and UE SDN application (APP) VNFs. In the MANO NFVI, the virtual layer executes MANO SDN vSW VNFs, MANO SDN CNT VNFs, MANO SDN APP VNFs, KPI/PCI vSW VNFs, KPI/PCI CNT VNFs, and KPI/PCI APP VNFs.

The MANO VNFs transfer networking data to the edge and core NFVI virtual layers to drive the execution of the UE SDN VNFs. To set-up a data session between the UEs, one of the UEs transfers a session request to a UE SDN application VNF. The UE SDN application VNF informs other UE SDN application VNFs to extend the session. The UE SDN VNFs transfer SDN controller API calls for the UE session to their associated UE SDN controller VNFs. The UE SDN controller VNFs transfer SDN data machine API calls to the SDN switches.

API responses flow back to from the SDN switches to the controller VNFs and to the application VNFs. If needed, an SDN application VNF may direct an SDN controller VNF to drive an SDN data machine to deliver user data to an NFVI for heavier processing by the UE SDN vSW VNFs. For example, a given flow may be directed to a core SDN vSW/VNF to perform transcoding, decryption, or the like.

The UE SDN VNFs generate SDN KPI data as described herein. The SDN switches also generate SDN KPI data. The KPI/PCI VNFs exchange the SDN KPI data with the UE SDN VNFs and the SDN switches. The MANO VNFs may exchange the KPI data between the UE SDN VNFs and the KPI/PCI VNFs.

The KPI/PCI application VNFs process the KPI data from the UE SDN VNFs and SDN switches to develop a set of data service indices. The KPI/PCI application VNFs process the data service indices against various patterns of interest to identify associated VNF controls. In particular, the KPI/PCI application VNFs generate PCIs that indicate network tasks like tracking usage, analyzing efficiency, or assuring quality.

The KPI/PCI application VNFs perform the identified network tasks by activating the appropriate vPs with task-focused Filter Criteria (FC). The vPs inject their FC into the pertinent vSWs. The vSWs filter the VNF traffic based the FC and transfer the filtered data to the vPs for +KPI generation. The vPs may apply logic to the filtered data such as counts thresholds, and the like to generate the +KPIs. The vPs may aggregate and format the +KPIs. The vPs transfer the +KPIs to the KPI/PCI VNFs in the SDN MANO NFVI. The KPI/PCI VNFs complete the network task using the +KPIs.

For example, an efficiency index for a private network may trigger the network task of analyzing access success and initial service quality for users as correlated to NFVI performance. The KPI/PCI APP VNFs direct the MANO SDN APP VNFs to load or activate vP VNFs for the private network analysis. The vP VNFs inject the private network FC for the +KPIs into the UE SDN vSW VNFs, and the UE SDN vSWs filter the VNF traffic with the private network FCs. The UE SDN vSW VNFs transfer their filtered data to the vP VNFs. The vP VNFs generate the +KPIs that characterize private network user access and initial service quality. The vP VNFs transfer the +KPIs to the KPI/PCI APP VNFs for indexing and task completion. In this example, the KPI/PCI APP VNFs associate the +KPIs for access/quality with NFVI metrics like CPU core types, memory capacity, and I/O throughput. Patterns in private network access/quality may then be correlated to NFV combinations of CPU cores, memories, and I/O transceivers, so these combinations may be avoided or relied on in the future.

Figure 6:
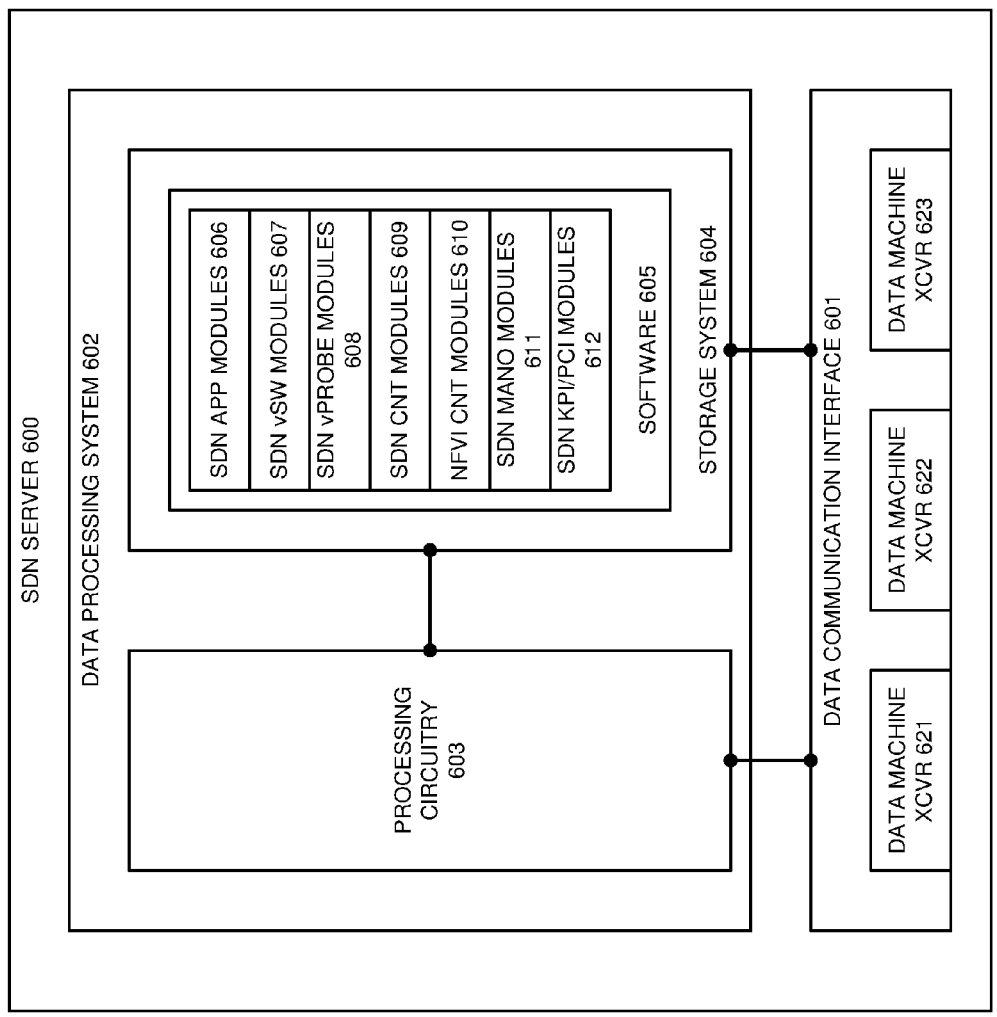
FIG. 6 illustrates a Software Defined Network (SDN) server to perform network tasks with Network Function Virtualization (NFV) virtual Probes (vProbes).

FIG. 6 illustrates Software Defined Network (SDN) server 600 to control Virtual Network Functions (VNFs). SDN server 600 is an example of data communication system 100, although system 100 may use alternative configurations and operations. SDN server 600 comprises data communication interface 601 and data processing system 602. Data communication interface 601 comprises data machine transceivers 621-623. Data processing system 602 comprises processing circuitry 603 and storage system 604. Storage system 604 stores software 605. Software 605 includes respective software modules 606-612.

Data machine transceivers 621-623 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606-612. SDN server 600 may be centralized or distributed. All or portions of software 606-612 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-612 direct circuitry 603 to perform the following operations. SDN application modules 606 process user and network data to drive SDN controller modules 608 to deliver data communication services to users. SDN vSW modules 607 exchange these SDN controller API calls and responses between SDN application modules 606 and SDN controller modules 608 and apply filter criteria from vProbe modules 608. SDN vProbe modules 608 transfer the filter criteria to vSW modules 607 and generate +KPIs based on the filtered data. SDN controller modules 609 process the SDN controller API calls to generate SDN data machine API calls to drive SDN data machines to deliver data communication services to users. SDN vSW modules 607 exchange and filter these SDN data machine API calls and responses between SDN controller modules 608 and the SDN data machines over data machine transceivers 621-623. NFVI control modules 610 include hypervisors, VCs, and NFVI software to implement NFV VNF controls. SDN MANO modules 611 include orchestrators, VNFMs, and VIMs to direct NFVI operations—including vProbe VNF installation and control. SDN modules 606-611 generate and transfer SDN KPI data like SDN signaling, NFVI metrics, user service quality to SDN KPI/PCI modules 612. SDN KPI/PCI modules 612 process the KPIs and +KPIs to generate PCIs and cPCIs. SDN KPI/PCI modules 612 process the PCIs and cPCIs to generate VNF control data, including vProbe controls, for transfer to the orchestrators in SDN MANO modules 611.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) Software Defined Network (SDN) to perform a network task for an International Mobile Subscriber Identity (IMSI), the method comprising:
   an NFV management system directing an NFV orchestration system to install a virtual Probe (vProbe) with filter criteria for the IMSI to collect IMSI Key Performance Indicators (KPIs) in the NFV SDN for the network task;
   the NFV orchestration system directing an NFV Infrastructure (NFVI) to install the vProbe;
   the NFVI on-boarding the vProbe;
   the vProbe sending the filter criteria for the IMSI to a virtual Switch (vSW) in the NFV SDN;
   the vSW applying the filter criteria for the IMSI to Virtual Network Function (VNF) traffic and transferring the filtered data for the IMSI to the vProbe;
   the vProbe processing the filtered data for the IMSI to generate and transfer the IMSI KPIs to the NFV management system; and
   the NFV management system processing the IMSI KPIs to perform the network task.

2. The method of claim 1 wherein the NFV management system performing the network task comprises collecting Home Subscriber System (HSS) access data for the IMSI.

3. The method of claim 1 wherein the NFV management system performing the network task comprises collecting Mobility Management Entity (MME) mobility data for the IMSI.

4. The method of claim 1 wherein the NFV management system performing the network task comprises tracing a communication path for the IMSI.

5. The method of claim 1 wherein the VNF traffic comprises Software Defined Network (SDN) application traffic.

6. The method of claim 1 wherein the VNF traffic comprises Software Defined Network (SDN) controller traffic.

7. The method of claim 1 wherein the VNF traffic comprises Home Subscriber System (HSS) traffic.

8. The method of claim 1 wherein the VNF traffic comprises Mobility Management Entity (MME) traffic.

9. The method of claim 1 wherein the VNF traffic comprises Packet Data Network Gateway (P-GW) signaling.

10. The method of claim 1 further comprising:
    the NFV management system determining to uninstall the vProbe after performing the network task;
    the NFV management system directing the NFV orchestration system to uninstall the vProbe from the NFVI;
    the NFV orchestration system directing the NFVI to uninstall the vProbe; and
    the NFVI off-boarding the vProbe.

11. A Network Function Virtualization (NFV) Software Defined Network (SDN) to perform a network task for an International Mobile Subscriber Identity (IMSI), the NFV SDN comprising:
    an NFV management system configured to direct an NFV orchestration system to install a virtual Probe (vProbe) with filter criteria for the IMSI to collect IMSI Key Performance Indicators (KPIs) in the NFV SDN for the network task;
    the NFV orchestration system configured to direct an NFV Infrastructure (NFVI) to install the vProbe;
    the NFVI configured to on-board the vProbe;
    the vProbe configured to send the filter criteria for the IMSI to a virtual Switch (vSW) in the NFVI;
    the vSW configured to apply the filter criteria for the IMSI to Virtual Network Function (VNF) traffic and transfer the filtered data for the IMSI to the vProbe;
    the vProbe configured to process the filtered data for the IMSI to generate and transfer the IMSI KPIs to the NFV management system; and
    the NFV management system configured to process the IMSI KPIs to perform the network task.

12. The NFV SDN of claim 11 wherein the network task comprises collecting Home Subscriber System (HSS) access data for the IMSI.

13. The NFV SDN of claim 11 wherein the network task comprises collecting Mobility Management Entity (MME) mobility data for the IMSI.

14. The NFV SDN of claim 11 wherein the network task comprises tracing a communication path for the IMSI.

15. The NFV SDN of claim 11 wherein the VNF traffic comprises Software Defined Network (SDN) application traffic.

16. The NFV SDN of claim 11 wherein the VNF traffic comprises Software Defined Network (SDN) controller traffic.

17. The NFV SDN of claim 11 wherein the VNF traffic comprises Home Subscriber System (HSS) traffic.

18. The NFV SDN of claim 11 wherein the VNF traffic comprises Mobility Management Entity (MME) traffic.

19. The NFV SDN of claim 11 wherein the VNF traffic comprises Packet Data Network Gateway (P-GW) signaling.

20. The NFV SDN of claim 11 further comprising:
   the NFV management system configured to determine to uninstall the vProbe after performing the network task;
   the NFV management system configured to direct the NFV orchestration system to uninstall the vProbe from the NFVI;
   the NFV orchestration system configured to direct the NFVI to uninstall the vProbe; and
   the NFVI configured to off-board the vProbe.

\* \* \* \* \*